(12) United States Patent
Sloo et al.

(10) Patent No.: US 7,036,092 B2
(45) Date of Patent: Apr. 25, 2006

(54) CATEGORICAL USER INTERFACE FOR NAVIGATION WITHIN A GRID

(75) Inventors: David Hendler Sloo, Menlo Park, CA (US); Daniel Danker, Sunnyvale, CA (US); Christopher M. White, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 680 days.

(21) Appl. No.: 10/155,497

(22) Filed: May 23, 2002

(65) Prior Publication Data

US 2003/0218637 A1  Nov. 27, 2003

(51) Int. Cl.
G06F 3/00 (2006.01)
G06F 3/14 (2006.01)
G06F 13/00 (2006.01)
H04N 5/445 (2006.01)

(52) U.S. Cl. ............... 715/841; 715/783; 715/810; 715/853; 725/39; 725/45; 348/113; 348/906

(58) Field of Classification Search ........... 715/700, 715/708, 709, 716, 719, 733, 764, 781, 783, 715/784, 786, 810, 818, 819, 821, 823, 825, 715/828–830, 835, 841, 853–855, 861, 902, 715/973; 345/473, 589; 348/119, 589, 113, 348/906; 725/37–52
See application file for complete search history.

(56) References Cited

U.S. PATENT DOCUMENTS

| | | | | |
|---|---|---|---|---|
| 5,485,175 A | * | 1/1996 | Suzuki | 715/841 |
| 5,559,945 A | * | 9/1996 | Beaudet et al. | 715/841 |
| 5,585,838 A | | 12/1996 | Lawler et al. | 348/13 |
| 5,630,119 A | | 5/1997 | Aristides et al. | 395/601 |
| 5,673,401 A | | 9/1997 | Volk et al. | 395/327 |
| 5,677,708 A | | 10/1997 | Matthews, III et al. | 345/115 |
| 5,731,844 A | | 3/1998 | Rauch et al. | 348/563 |
| 5,828,360 A | * | 10/1998 | Anderson et al. | 715/834 |
| 6,169,543 B1 | * | 1/2001 | Wehmeyer | 725/47 |
| 6,448,987 B1 | * | 9/2002 | Easty et al. | 715/834 |
| 6,549,219 B1 | * | 4/2003 | Selker | 715/834 |
| 6,567,108 B1 | * | 5/2003 | Master et al. | 715/853 |
| 6,678,891 B1 | * | 1/2004 | Wilcox et al. | 725/42 |

(Continued)

FOREIGN PATENT DOCUMENTS

GB 2359713 A * 8/2001

(Continued)

OTHER PUBLICATIONS

Alan Cohen, "AltaVista (Evaluation)", Sep. 15, 1998, PC Magazine, Product Announcement, p. 50(1).*

(Continued)

*Primary Examiner*—X. L. Bautista
(74) *Attorney, Agent, or Firm*—Workman Nydegger

(57) ABSTRACT

Methods, systems, and computer program products for presenting a plurality of options for selection. Each option is organized into either a category or a sub-category that is associated with a category. The association between categories and sub-categories is independent of time. Categories are displayed along one axis and sub-categories are displayed simultaneously along another orthogonal axis. The axis chosen for categories may depend on the direction that text associated with the categories is written. Categories and sub-categories are available for immediate selection, without first having to highlight or select any option. To account for a large number of options, categories and sub-categories may scroll as needed. The appearance of categories and sub-categories may be distinguished in some way, such as through colors, fonts, or borders.

52 Claims, 8 Drawing Sheets

U.S. PATENT DOCUMENTS

| | | | |
|---|---|---|---|
| 6,754,906 B1 * | 6/2004 | Finseth et al. | 725/45 |
| 6,918,132 B1 * | 7/2005 | Gargi | 725/45 |
| 2003/0046700 A1 * | 3/2003 | Wilcox et al. | 725/60 |

FOREIGN PATENT DOCUMENTS

| | | |
|---|---|---|
| WO | WO 01/77907 A2 * | 10/2001 |

OTHER PUBLICATIONS

Uchiyigit, G.; Carlin, B.; Quak, E.; Cunningham, J.; Agents in the Box [Digital TV Set-Top Boxes]; *Human-Computer Interaction: Ergonomics and User Interfaces. Proceedings of HCI International '99 (8th International Conference on Human-Computer Interaction)*, vol. 2, 1999, pp. 157-161.

Antoniazzi, S.; Marmolin, H.; Schapeler, G.; Weickert, B.; Musist Browser and Navigation Concept; *Multimedia Applications, Services and Techniques—ECMAST '98. Third European Conference Proceedings*; 1998; pp. 260-273.

Hartwig, S.; Rautenberg, T.; Bollmann, T.; Broadcasting and Processing of Program Guides for Digital TV; *SMPTE Journal*; vol. 106, No. 10; Oct. 1997; pp. 727-732.

Kai, K.; Usui, K.; Ueno, M.; Isobe, T.; Services and Navigation in Satellite ISDM; *ISCE '97. Proceedings of 1997 IEEE International Symposium on Consumer Electronics*; 1997; pp. 1-4.

* cited by examiner

Fig. 1A

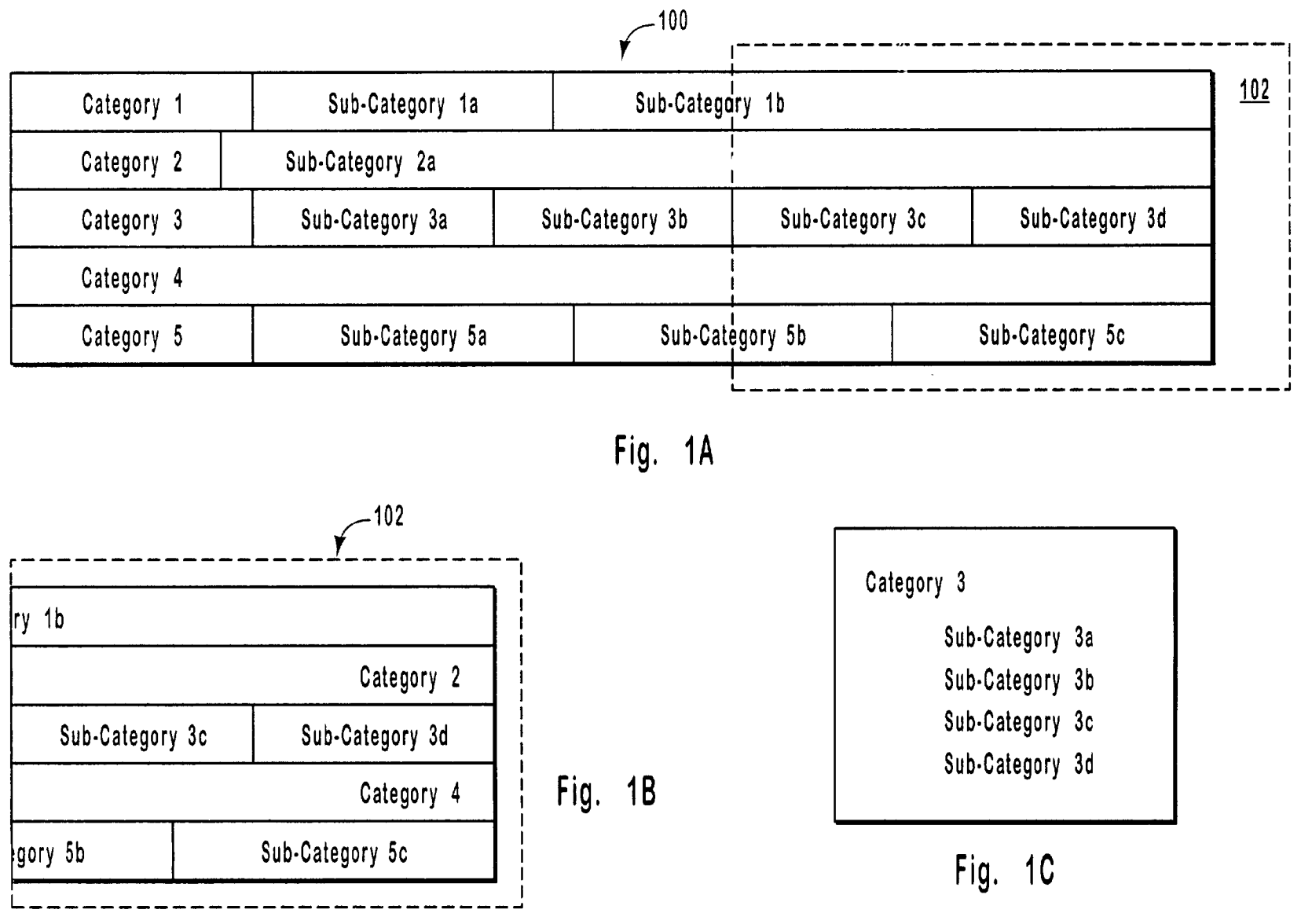

| Category 1 | Sub-Category 1a | Sub-Category 1b |
|---|---|---|
| Category 2 | Sub-Category 2a | |
| Category 3 | Sub-Category 3a | Sub-Category 3b | Sub-Category 3c | Sub-Category 3d |
| Category 4 | | |
| Category 5 | Sub-Category 5a | Sub-Category 5b | Sub-Category 5c |

Fig. 1B ry 1b | Category 2 | Sub-Category 3c | Sub-Category 3d | Category 4 | Sub-Category 5c
gory 5b

Fig. 1C

Category 3
    Sub-Category 3a
    Sub-Category 3b
    Sub-Category 3c
    Sub-Category 3d

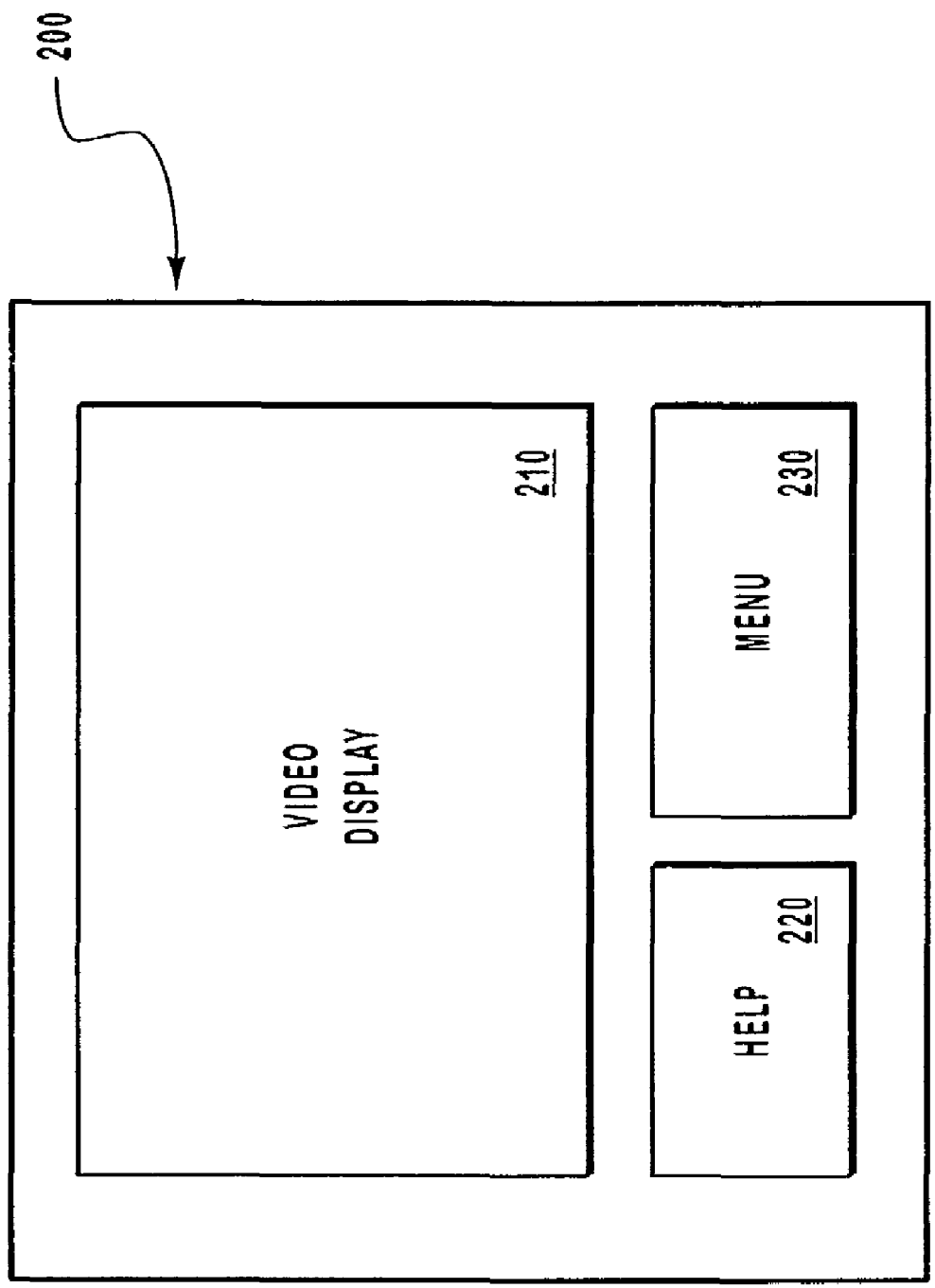

CATEGORICAL USER INTERFACE FOR NAVIGATION WITHIN A GRID

CROSS-REFERENCE TO RELATED APPLICATIONS n/a

BACKGROUND OF THE INVENTION

1. The Field of the Invention

The present invention relates to user interface menus in computers and electronic devices. More specifically, the present invention relates to methods, systems, and computer program products for presenting a plurality of options for selection in a computerized system.

2. Background and Related Art

For many, interacting with computerized systems, including consumer electronics is a daunting task. One relatively well-known example of this problem relates to VCRs with an internal clock that must be set manually. Until set, the clock's display typically flashes "12:00" to indicate that the correct time has not been entered. As a fair number of contemporary jokes may attest, the flashing "12:00" is a reasonably common occurrence, that often is tolerated for a significantly longer duration than would be acceptable for other clocks. While a multitude of reasons may contribute to this phenomenon, an awkward user interface is a likely culprit, especially for those who lack experience with computerized systems.

At least in the case of a VCR, manufacturers have elected to include automatic time setting features based on a broadcast signal rather than address the underlying user interface problem. From a practical perspective, an automated time setting feature may be the best solution, but many user interface problems may not be solved through automation. For example, recording a broadcast, selecting a language for text displayed by the VCR, etc., usually depend on the preferences of a user and therefore are subject to customization by the end consumer.

Similar problems exist in other computerized systems, such as personal computers. Generally, the software that runs on personal computers provides users with a rather large number of options and is subject to a great deal of customization. It is not uncommon for a user to know or suspect that a particular feature exists, but not know how to access the feature. Nevertheless, the average personal computer user may possess more technical sophistication than the average VCR user and therefore be more equipped to handle a somewhat more demanding user interface.

Independent of the sophistication of a particular user, however, user interfaces for computerized systems tend to share at least one common element—multiple levels of hierarchy that cannot be displayed at one time. The first level of hierarchy often provides a number of predefined abstract categories, which when selected or highlighted, lead to initially hidden second, third, fourth, etc., levels of hierarchy, and ultimately to a particular option of interest. Each level is usually arranged to avoid scrolling, particularly at the highest level of the hierarchy. In many cases, one or more catch-all categories are used for options that do not fit cleanly into any particular category. Although hiding levels of hierarchy may facilitate the presentation of many options within the same display area, it is often difficult to anticipate or determine the location of a particular option when some levels of the hierarchy are not visible. Consistently and repeatedly discovering an option that appears several layers deep can be especially difficult.

In the context of computerized systems for displaying broadcast video, grids, also known as electronic program guides or "EPGs" are often used for program selection. Sources, such as channels, appear along one EPG border (typically along the left vertical border) and time slots appear along another EPG border (typically the top horizontal border). Available programming fills the remainder of the grid, according to the source providing a program and the time that the program will be broadcast. Navigation within an EPG may be directed using a relatively simple input device, such as a remote control, with arrow and selection inputs. As a general rule, however, not everything shown is available for selection. For example, while past and future program choices are shown, only programs currently being broadcast may be selected for display. Electronic program guides provide a relatively simple interface model for options that are related by time.

BRIEF SUMMARY OF THE INVENTION

The invention relates to presenting a plurality of options for selection by defining each option as, or otherwise organizing each option into, either a category or a sub-category that is associated with a category. The association between categories and sub-categories is independent of time. The categories are displayed, or otherwise listed, along a category axis, which typically runs either vertically or horizontally, depending on the direction that text identifying the category is written. Sub-categories are simultaneously displayed, or otherwise listed, along a sub-category axis orthogonal to the category axis, without first having to be highlighted or selected. All displayed categories and sub-categories may be available for immediate selection.

The display of categories and sub-categories may scroll if, for example, more categories and sub-categories are defined than can be displayed at once. The scrolling of categories may be circular such that the first category may be reached as if it follows the last category and the last category may be reached as if it precedes the first category. Since an unequal number of sub-categories may be defined for each category, it may be possible scroll the display of sub-categories for a particular category beyond the display of sub-categories for other categories. In this situation, it may be desirable to redisplay or repeat the other categories if there are no further sub-categories to display.

Categories and sub-categories may be displayed in different background and/or foreground colors or distinguished in some other way. Input may be received for navigating between and selecting options. In response to selecting a category, all of the sub-categories associated with the category may be displayed without displaying the sub-categories for any other category. Help information may be displayed for a currently highlighted option. In a computerized system that is capable of receiving broadcast video data and is capable of interacting with one or more servers over a computer network, the plurality of options may comprise configuration options for the computerized system. Broadcast video data and help information may be displayed simultaneously with the display of the categories and sub-categories.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered as limiting its scope, the invention will be described and explained with additional specificity and detail through the use of the accompanying drawings in which:

FIG. 1A is a block diagram illustrating an example presentation of a plurality of options in accordance with the present invention;

FIG. 1B shows a block diagram illustrating an example portion of the plurality of options presented in FIG. 1A, in response to scrolling;

FIG. 1C shows a portion of the plurality of option presented in FIG. 1A, in response to the selection of a category;

FIG. 2A illustrates an example use of the present invention in the context of a system for viewing video data;

DETAILED DESCRIPTION OF THE PREFERRED EMBODIMENTS

Figure 2B:
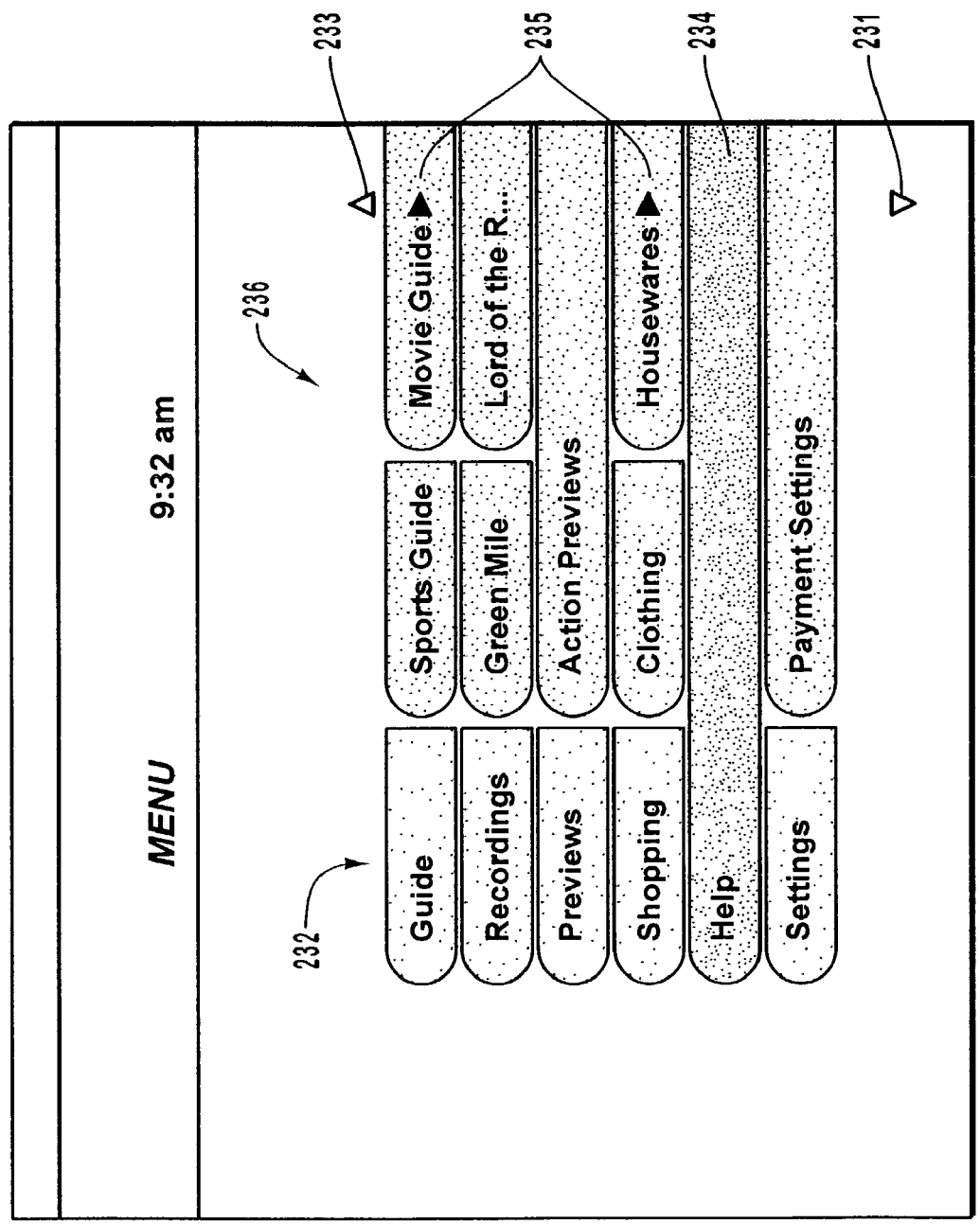
FIGS. 2B and 2C illustrate example menus for the system for viewing video data shown in FIG. 2A.

The present invention extends to methods, systems, and computer program products for presenting a plurality of options for selection. FIG. 1A illustrates a two-dimensional menu 100, with options organized into: category 1, with sub-categories 1a and 1b; category 2, with sub-category 2a; category 3, with sub-categories 3a, 3b, 3c, and 3d; category 4; and category 5, with sub-categories 5a, 5b, and 5c. Categories are listed vertically down the left side of the grid, and sub-categories are listed horizontally, in line with their associated category. In some circumstances, it may also be desirable to have sub-categories line up vertically with each other. It should be noted, however, that menu 100 is provided only for purposes of illustration and represents but one example of many possible embodiments of the present invention.

One reason for listing categories vertically in FIG. 1A relates to making efficient use of available space based on the direction in which English is written. For example, when options have unequal lengths of text associated with them, listing categories horizontally is likely to result in columns that are as wide as the longest text. This may lead to wasting significant amounts of available space, particularly where the length of text varies significantly from one option to another. As shown in FIG. 1A, listing categories vertically precludes the length of text in one category from impacting the number of other categories that may be displayed concurrently, without scrolling. Accordingly, the direction in which categories and sub-categories are listed may depend on the direction in which a given language is written.

Sub-categories display without first having to highlight or select an associated category. Although highlighting generally involves some type of marking or other indication that an option is the focus of user input, and selecting generally involves actually directing user input to a particular option, in many circumstances selecting may be used interchangeably with highlighting to describe similar operations. As used in this application, therefore, selecting should be interpreted broadly as a generic term that may encompass both indicating focus and directing input. In any event, categories and sub-categories are displayed simultaneously, such that sub-categories are available for immediate selection.

By displaying sub-categories and their associated categories simultaneously, each sub-category provides examples of the types of options that are included within a particular category. Examples aid navigation significantly, especially where scrolling is necessary to view all options, because the examples provide hints as to where a desired option is likely to be located. That is, a user may be able to reason that if a given category contains certain sub-categories, the given category is either more likely or less likely to contain the sub-category in which the user is interested. As a further navigation aid (although not shown in FIG. 1A), categories and sub-categories may be distinguished in appearance. For example, categories and sub-categories may have different background and/or text colors, fonts, borders, etc.

Navigation from one option to another may be controlled using a relatively simple input device with arrows for direction input and a button for selecting a desired option. As indicated above, depending on the number of options and the space available for presenting options, scrolling may be supported. For example, FIG. 1A shows a portion 102 of menu 100 that exceeds the available space for presenting options and is accessible through scrolling the display. Starting at category 3, a right arrow direction input would move first to sub-category 3a, followed by sub-category 3b, and then to sub-category 3c. In navigating to sub-category 3c, menu 100 scrolls so that the portion 102 exceeding available space is displayed, as shown in FIG. 1B and described in further detail below.

Scrolling may be circular in one direction and indefinite in another direction. For example, scrolling vertically from one category to another may be circular such that category 1 options may be reached by scrolling down from category 5 options and such that category 5 options may be reached by scrolling up from category 1 options. In many circumstances, circular scrolling effectively reduces the number of options in half from a navigation standpoint. In a list of fifteen options, any option may be reached by either navigating down seven times or by navigating up seven times— without circular scrolling, moving from the first option to the last option would require navigating down fourteen times. Accordingly, options may be divided into a larger number of more concrete categories, without increasing the number of operations required for navigation. Many users find it more intuitive to have a larger number of categories than to create entirely abstract or catch-all categories for those options that do not fit elsewhere.

Horizontal scrolling between categories and sub-categories, and from one sub-category to another, is indefinite in extent because there is no specific limitation on the number of sub-categories that may be associated with a category. In FIG. 1A, horizontal scrolling begins with categories and ends with the last sub-category for each category (i.e., it is not possible to scroll to the left of categories nor to the right of the last sub-category for a category). It should be emphasized, however, that the foregoing description of scrolling is only one of many possible implementations. In particular, scrolling could occur in either larger or smaller increments, may be controlled separately from navigation to a particular option, may wrap horizontally as well as vertically, etc.

Turning now to the portion 102 of menu 100 that is shown in FIG. 1B, note that category 2 and category 4 are redisplayed or repeated. Category 2 has a single associated sub-category 2a, and category 4 has no associated sub-categories. As a result, when this display is scrolled to reveal sub-category 3c, there may be nothing to display for category 2 or category 4. Rather than display nothing, however, categories may be redisplayed or repeated as a navigation aid.

When a category is selected, the sub-categories associated with the category may be displayed without displaying any other sub-categories, as shown in FIG. 1C. For example, by selecting category 3, sub-categories 3a, 3b, 3c, and 3d are listed. Note that by displaying the options associated with category 3 in this manner, it may be possible to reduce or eliminate the need for scrolling. Furthermore, by providing both types of user interfaces (i.e., the one illustrated in FIG. 1A and the one illustrated in FIG. 1C), a user has the benefit of choosing a preferred interface for a given task, which may vary from task to task as well as from user to user.

FIG. 2A illustrates an example use of menu 100 in the context of a system for viewing video data that includes a display 200. Two such systems for viewing video data are described below in connection with FIGS. 4 and 5. Display 200 includes a help area 220 for displaying help information related to menu 100 as displayed in menu area 230. For example, help area 220 might provide full sentences, graphics, etc., describing a currently highlighted option. Video display area 210 may display video information, such a broadcast video signals from a satellite, a cable or Internet connection, and the like, simultaneously with menu 100 (in menu area 230) and/or help area 220.

Figure 2C:
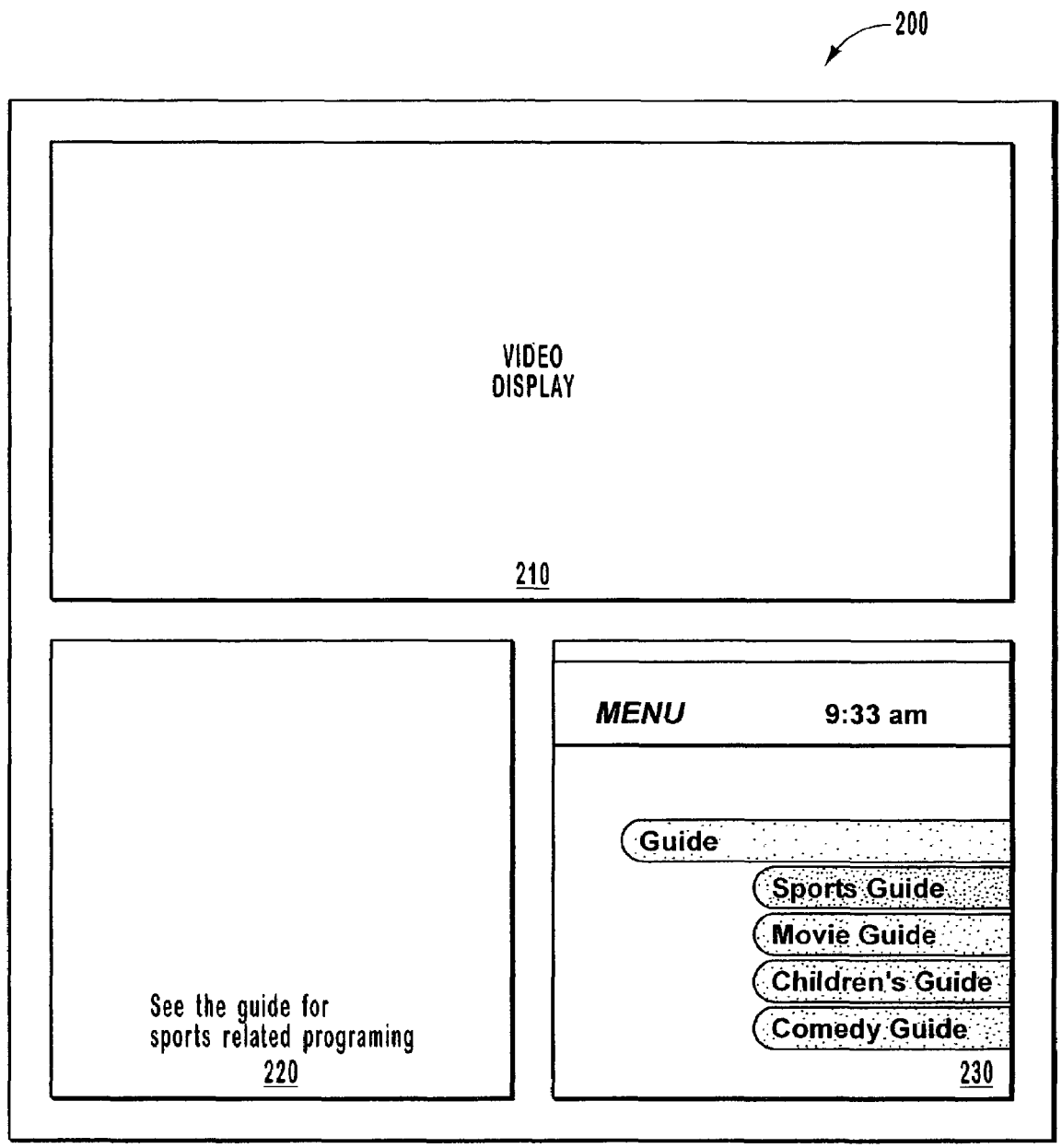

FIGS. 2B and 2C illustrate example menus for a system for viewing video data that includes display 200 as shown in FIG. 2A. FIG. 2B shows an enlarged view of menu area 230, or alternatively represents a full-screen version of menu area 230. Categories 232 of the menu include Guide, Recordings, Previews, Shopping, Help, and Settings. Of the sub-categories 236 for categories 232, Sports Guide, Movie Guide, Green Mile, Lord of the Rings, Action Previews, Clothing, Housewares, and Payment Settings are currently displayed.

Right arrows 235 indicate that additional sub-categories exist for a particular category. For example, the Guide category also includes sub-categories for Children's Guide and Comedy Guide, and the Shopping category also includes sub-categories for Books, Gifts, and Electronics, all of which may be reached by scrolling the menu horizontally to the right. The sub-category Lord of the Rings has been abbreviated with ellipses because the full description does not fit within the allotted display area. The ellipses indicate that the full description also may be reached by scrolling horizontally to the right. An arrow is not used for this case because there are no other sub-categories. When scrolling horizontally, the categories may remain fixed so that only sub-categories scroll off the display or the categories may scroll as well.

Generally, sub-categories provide a fairly good description for the category to which they belong. Accordingly, if Guide were to scroll off the display, the various sub-categories that are displayed in the scrolling process provide a relatively good reminder of the overall category. In some circumstance, however, there may be no sub-categories to display, or all of the sub-categories may be scrolled off the display. For example, the Help category does not have any sub-categories and the Preview category has only an Action Previews sub-category. In scrolling to the Electronics sub-category of the Shopping category, the Help category and the Action Previews sub-category may scroll off the display leaving only blank lines in their place. Under these and other circumstances, it may be helpful to repeat the category following the last sub-category. In other words, for purposes of scrolling, the Previews category would follow the Action Previews sub-category. Similarly, the Help category would follow itself. Repeating a category may include justifying the category description consistent with the scrolling direction—a category repeated due to scrolling right may be right justified, whereas other categories display left justified, etc.

Up arrow 233 and down arrow 231 indicate that the menu may be scrolled up or scrolled down. As described above in connection with FIG. 1A, the menu is circular so that Guide will appear after Settings when scrolling down and Settings will appear above Guide when scrolling up. Of course, in other embodiments, additional categories that do not initially display may be part of a menu and may display when scrolling up and scrolling down prior to repeating categories that display initially.

Note that the categories are shaded similarly to provide additional visual feedback that each is at a category level, with the exception of Help category 234, which is shady differently to indicate that it is the currently highlighted option for selection. Sub-categories 236 also show like shading (different from the category level shading) to indicate that each is at a sub-category level. In this example menu, shading represents color variations, including gray scale variations, to distinguish between categories and sub-categories.

As is apparent in FIG. 2B, categories and sub-categories may include static and/or dynamic content. For example, Recordings represent a predefined category, with Green Mile and Lord of the Rings representing dynamic content based on what has been recorded. Of course, the categories and sub-categories may be completely dynamic, completely static, or a combination of static and dynamic as previously described.

The present invention is not necessarily limited to any particular data. In some embodiments, the present invention may be used to sort a collection of related data into categories and sub-categories. For example, a list of names, perhaps in a contact directory for a telephone with a display screen, may be sorted and categorized as follows:

A Aaron Angus Azarath
B Baxter Bethune Bobola Bunker
C Camarillo Carrillo Cartwright
E Edgerton
F Farthingsworth Fox Fulmarsmith
H Hanson Hesther Hunsaker
K Knox Kramer
L Landau Lloyd Lundy Letters without names are omitted, indicating that both categories and sub-categories are based on the collection of data. Alternatively, the categories may be predefined and displayed whether or not any sub-categories are present. Dividing a collection of data into categories and sub-categories may involve arbitrarily complex data, and the data itself may include an explicit and/or implicit category designation, such as related or common data. Depending on the particular embodiment, a collection specific algorithm for dividing data into categories and sub-categories may be used.

FIG. 2C illustrates an additional example menu in the context of a system for viewing video data as shown in FIG. 2A. In this example, video display area 210, help area 220, and menu area 230 display simultaneously. The contents of the video display area 210 are not necessarily related to any interaction in the menu area 230 and in many circumstances will not be. Only the Guide category and its corresponding sub-categories, Sports Guide, Movie Guide, Children's Guide, and Comedy Guide, display in menu area 230.

As described above, menu area 230 may include a single category because the Guide category shown in FIG. 2B was selected. Although not shown in FIG. 2C, sub-categories may scroll as appropriate to accommodate an arbitrary number of sub-categories, and the scrolling may be circular. The shading in FIG. 2C is analogous to the shading in FIG. 2B, with separate category (Guide), sub-category (Movie Guide, Children's Guide, and Comedy Guide), and highlight shading (Sports Guide). Note also that help text appears in help area 220 for the highlighted item, Sports Guide. Of course, help area 220 may contain any type of content, including text, graphics, multimedia, etc., for a highlighted category or sub-category.

In one embodiment, in addition to implementing the present invention, menu area 230 also is used for displaying more traditional electronic program guide ("EPG") data. EPG data typically includes a source, such as a broadcast channel, listed vertically down the left border, with time slots listed horizontally along the top border, and available programming filling the remainder of the guide. Various operations, such as tuning to a particular broadcast, may be carried out through the EPG. Unlike an EPG, however, menu 100 (FIG. 1A) includes categories and sub-categories that are unrelated to and independent of time. For example, menu 100 may include an email category with sub-categories for viewing new email messages, viewing old email messages, composing a new email message, etc. In this email example, category and sub-categories are related by subject matter (email), rather than by time as is typical for EPGs (a program at one time, followed by a later program at a later time, and so on). Of course, the foregoing is merely one example—categories and sub-categories may be related in many other ways that are not based on time. Being independent of time, all of the options in menu 100 represent tasks that can be pursued immediately. In contrast, for a time-based EPG, while selecting items that represent programs currently being broadcast may display those programs immediately, selecting items that represent future programs typically only display information about those upcoming broadcasts.

Nevertheless, an EPG may operate simultaneously with the present invention. In some respects, users of an EPG may benefit from the similarities of menu 100 and the EPG. Users become familiar with and competent in navigating the EPG so that learning in an EPG environment may be transferred to an environment that makes use of menu 100. For these EPG users, more traditional menus, such as the one referenced above in connection with FIG. 1C, are more likely impede navigation than aid it. Therefore, menu 100, with its categories and sub-categories that are independent of time and immediately selectable, may be used for controlling various settings within a computerized system that includes a display 200, including video settings like color, tint, etc., audio settings, access to one or more EPGs, recorded programs, email, favorite programming, and the like, and thus provide a unified menu for configuring, operating, and interacting with various computerized systems, including the system for viewing video data that is illustrated in FIG. 5. The present invention also may be used in many other computerized systems, such as the ones described below in connection with FIG. 4.

The present invention may be described in terms of methods comprising functional steps and/or non-functional acts. The following is a description of acts and steps that may be performed in practicing the present invention. Usually, functional steps describe the invention in terms of results that are accomplished, whereas non-functional acts describe more specific actions for achieving a particular result. Although the functional steps and non-functional acts may be described or claimed in a particular order, the present invention is not necessarily limited to any particular ordering or combination of the acts and/or steps.

Figure 3A:
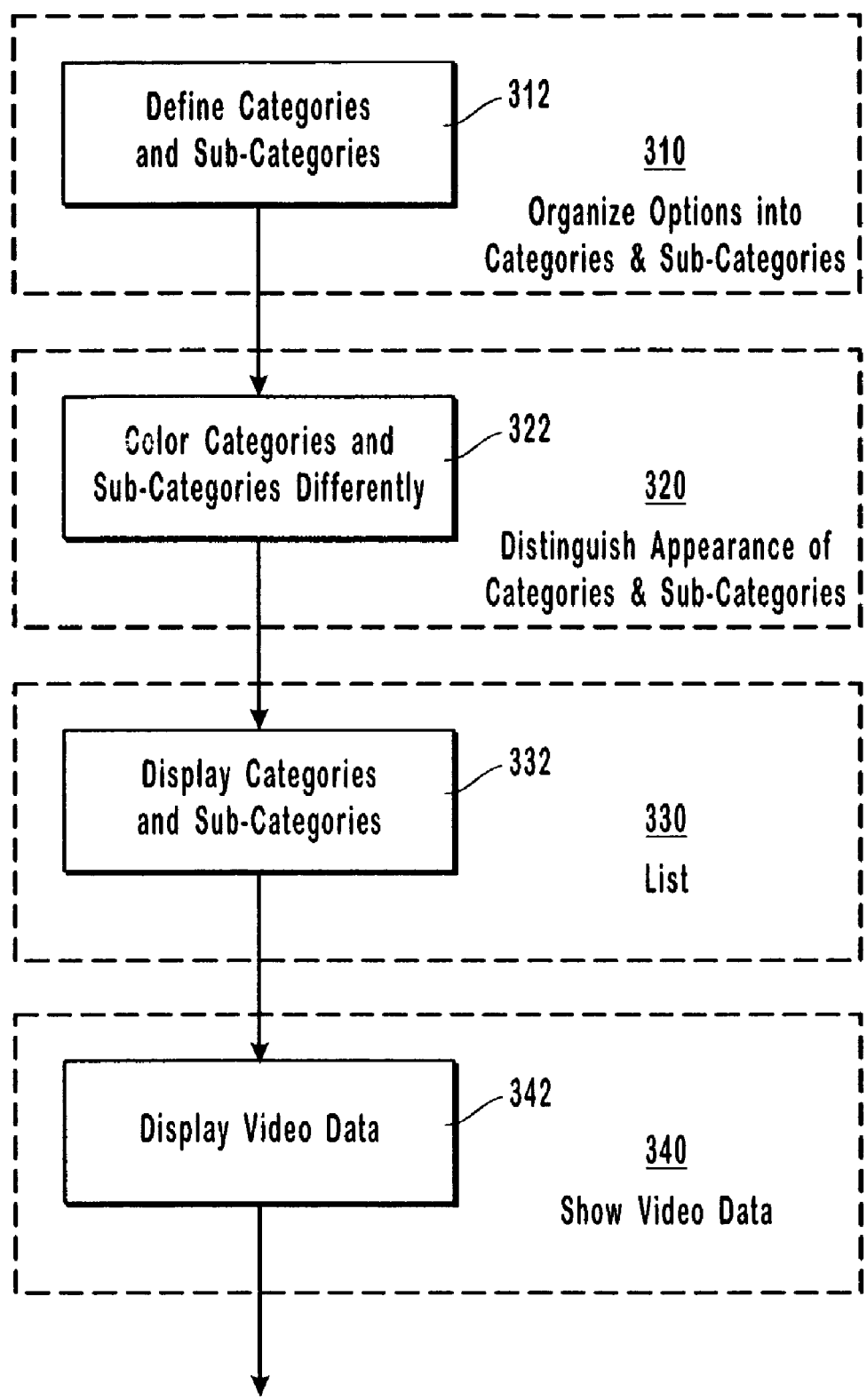
FIGS. 3A and 3B are flow diagrams showing example acts and steps for methods according to the present invention.
Figure 3B:
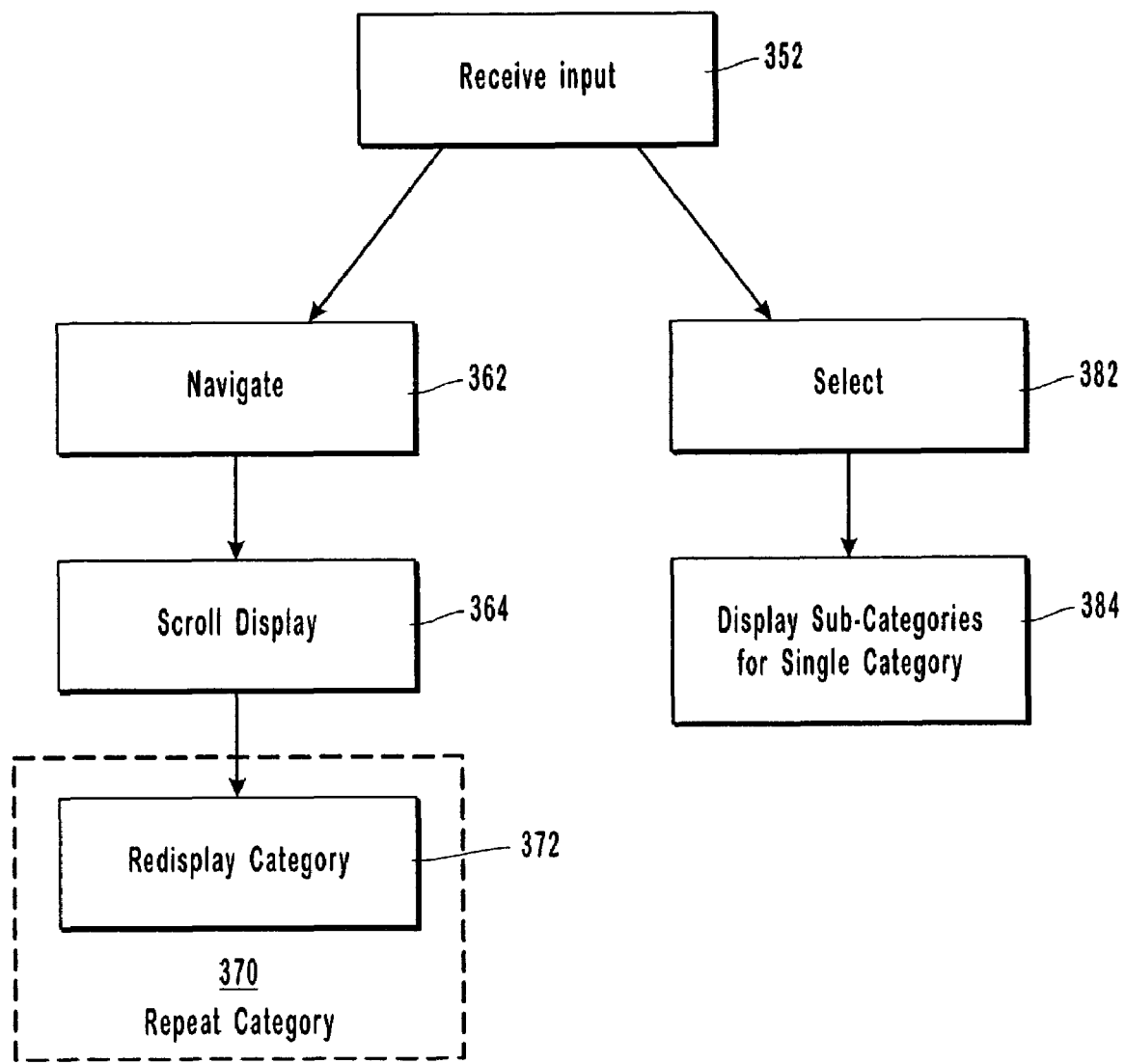

FIGS. 3A and 3B are flow diagrams showing example acts and steps for methods according to the present invention. A step for organizing (310) each of a plurality of options into either (i) a category, or (ii) a sub-category associated with a category, may include an act of defining each of the plurality of options as either a category or a sub-category such that one or more categories and one or more sub-categories are defined or identified. The plurality of options may comprise configuration options for a computerized system that is capable of receiving broadcast video. A step for distinguishing (320) the appearance of at least one of the categories from the appearance of at least one of the sub-categories many include an act of displaying (322) the at least one category in one color and the at least one sub-category in another color. The appearance of categories and sub-categories may be distinguished in many other ways, such as by fonts, borders, and the like.

A step for simultaneously listing (330) at least one of the one or more categories along a first, category axis, and at least one of the one or more sub-categories along a second sub-category axis may include an act of simultaneously displaying (332) the at least one of the one or more categories and the at least one of the one or more sub-categories. Each category and or sub-category may have associated text in a given language that is written in a particular direction and the category axis may be selected to extend in a direction that is based on the particular direction in which the associated text is written. As noted above, each of the categories and sub-categories may be available for immediate selection. A step for simultaneously showing (340) video data may include an act of displaying (342) the video data. Help information also may be displayed.

As shown in FIG. 3B, a method in accordance with the present invention also may include an act of receiving (352) input, such as for navigating (362) among the plurality of options and for selecting (382) a particular option. In the case of receiving input that selects a category which has a plurality of sub-categories associated with it, the present invention may include an act of displaying (384) the plurality of sub-categories that are associated with the selected category, without displaying any other sub-categories. In the case of receiving input for navigating, the present invention may include an act of scrolling (364) the display. As indicated above, scrolling from one category to another may be circular such that the last category may be reached as if it preceded the first category and such that the first category may be reached as if it followed the last category. A step for repeating (370) a given category following a last sub-category may include an act of redisplaying (372) the given category following the last sub-category. Note that although input for navigating and input for selecting are described separately, they should not necessarily be interpreted as being mutually exclusive. In many embodiments, it may be desirable to select and navigate simultaneously.

Figure 4:
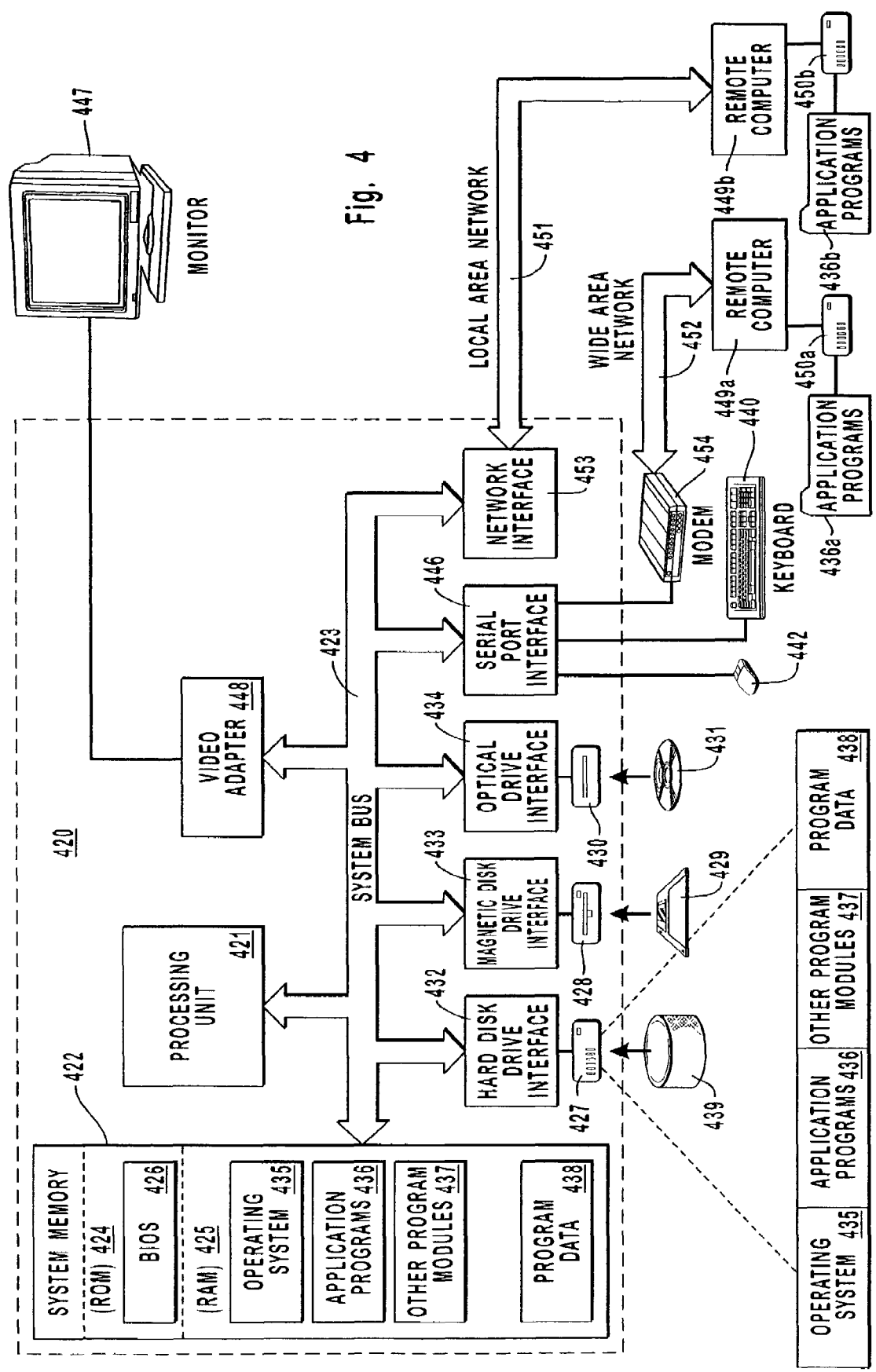
FIGS. 4 and 5 illustrate example systems that provide suitable operating environments for the present invention.
Figure 5:
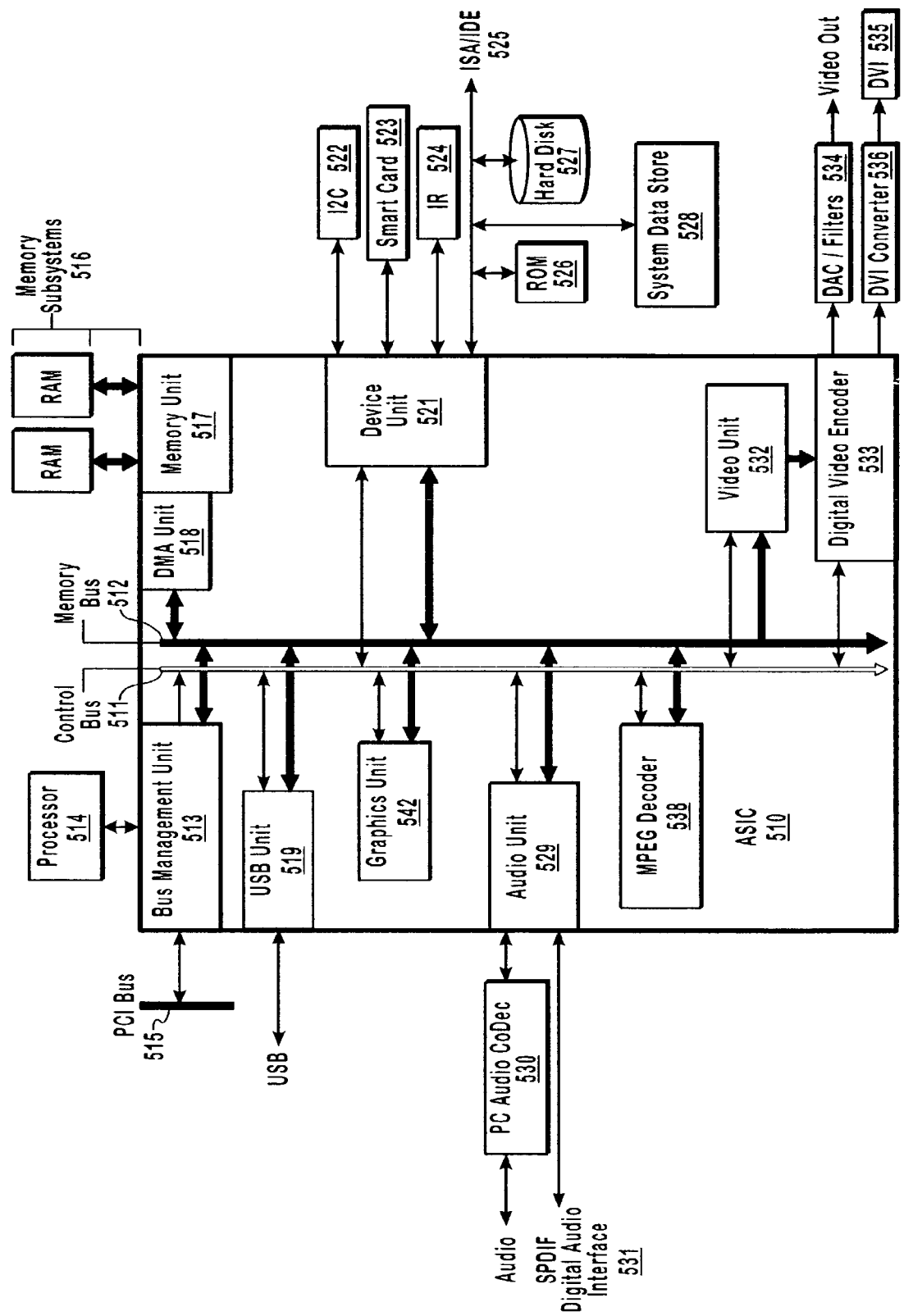

FIGS. 4 and 5 illustrate example systems that provide suitable operating environments for the present invention. Embodiments within the scope of the present invention may comprise one or more special purpose and/or one or more general purpose computers including various computer hardware, as discussed in greater detail below. FIG. 4 represents a more general purpose computerized system, and FIG. 5 represents a more special purpose computerized system for managing and processing video data. However, it should be emphasized that the present invention is not necessarily limited to any particular computerized system and may be practiced in a wide range of computerized systems including telephones, information kiosks, vending machines, etc. The following examples systems, therefore, should not be interpreted as imposing any particular environmental requirements on the present invention.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media may comprise physical storage media such as RAM, ROM, EEPROM, CD-ROM or other optical disc storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

FIG. 4 and the following discussion are intended to provide a brief, general description of a suitable computing environment in which the invention may be implemented. Although not required, the invention may be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, television set-top boxes, multi-processor systems, microprocessor-based or programmable consumer electronics, network PCs, mini-computers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference then to FIG. 4, an exemplary system for implementing the invention includes a general purpose computing device in the form of a conventional computer 420, including a processing unit 421, a system memory 422, and a system bus 423 that couples various system components including the system memory 422 to the processing unit 421. The system bus 423 may be any of several types of bus structures including a memory bus or memory controller, a peripheral bus, and a local bus using any of a variety of bus architectures. The system memory includes read only memory (ROM) 424 and random access memory (RAM) 425. A basic input/output system (BIOS) 426, containing the basic routines that help transfer information between elements within the computer 420, such as during start-up, may be stored in ROM 424.

The computer 420 may also include a magnetic hard disk drive 427 for reading from and writing to a magnetic hard disk 439, a magnetic disk drive 428 for reading from or writing to a removable magnetic disk 429, and an optical disc drive 430 for reading from or writing to removable optical disc 431 such as a CD-ROM or other optical media. The magnetic hard disk drive 427, magnetic disk drive 428, and optical disc drive 430 are connected to the system bus 423 by a hard disk drive interface 432, a magnetic disk drive-interface 433, and an optical drive interface 434, respectively. The drives and their associated computer-readable media provide nonvolatile storage of computer-executable instructions, data structures, program modules and other data for the computer 420. Although the exemplary environment described herein employs a magnetic hard disk 439, a removable magnetic disk 429 and a removable optical disc 431, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 439, magnetic disk 429, optical disc 431, ROM 424 or RAM 425, including an operating system 435, one or more application programs 436, other program modules 437, and program data 438. A user may enter commands and information into the computer 420 through keyboard 440, pointing device 442, or other input devices (not shown), such as a wireless remote control, microphone, joy stick, game pad, antenna, satellite dish, scanner, or the like. These and other input devices are often connected to the processing unit 421 through a serial port interface 446 coupled to system bus 423. Alternatively, the input devices may be connected by other interfaces, such as a parallel port, a game port, a universal serial bus (USB), etc. A monitor 447 or another display device is also connected to system bus 423 via an interface, such as video adapter 448. In addition to the monitor, personal computers typically include other peripheral output devices (not shown), such as speakers and printers.

The computer 420 may operate in a networked environment using logical connections to one or more remote computers, such as remote computers 449a and 449b. Remote computers 449a and 449b may each be another personal computer, a server, a router, a network PC, a peer device or other common network node, and typically include many or all of the elements described above relative to the computer 420, although only memory storage devices 450a and 450b and their associated application programs 436a and 436b have been illustrated in FIG. 4. The logical connections depicted in FIG. 4 include a local area network (LAN) 451 and a wide area network (WAN) 452 that are presented here by way of example and not limitation. Such networking environments are commonplace in office-wide or enterprise-wide computer networks, intranets and the Internet.

When used in a LAN networking environment, the computer 420 is connected to the local network 451 through a network interface or adapter 453. When used in a WAN networking environment, the computer 420 may include a modem 454, a wireless link, or other means for establishing communications over the wide area network 452, such as the Internet. The modem 454, which may be internal or external, is connected to the system bus 423 via the serial port interface 446. In a networked environment, program modules depicted relative to the computer 420, or portions thereof, may be stored in the remote memory storage device. It will be appreciated that the network connections shown are exemplary and other means of establishing communications over wide area network 452 may be used.

FIG. 5 illustrates an example application specific integrated circuit ("ASIC") 510 for a computerized system such as a digital content receiver. ASIC 510 may receive content from any of a variety of sources, including broadcast systems, cable systems, satellite systems, and the Internet. Although video data may be received primarily, it should be clear that the present invention is not necessarily limited to any particular environment. For example, ASIC 510 may be incorporated into any type of consumer electronics device, including game consoles, tuners, set-top boxes, recorders, personal computers, handheld computing devices, and the like, for processing digital video, digital audio, executable software, scripts, marked up text and data, email, etc.

ASIC 510 includes a number of components that communicate over a control bus 511 and a memory bus 512. The control bus 511 carries relatively low bandwidth control information that controls the operation of each of the components of the ASIC 510. The memory bus 512 carries higher bandwidth information such as video information between each of the components of the ASIC 510 and memory. A bus management unit 513 manages the communication over the control bus 511 and also interfaces with a processor 514 and a PCI bus 515.

The processor 514 oversees the general video processing by dispatching instructions over the control bus 511 instructing the various components of the ASIC 510 to perform their specialized tasks. The processor 514 also monitors the progress of such tasks, thus controlling the various components of ASIC 510 in a coordinated fashion. The processor 514 may be any processor capable of performing such oversight functions including a MIPS or X86 architecture processor.

Typically, memory is required to perform such coordinated operations. Accordingly, the ASIC 510 has access to one or more memory subsystems 516 which provide volatile memory that is shared between the components of the ASIC 510. The memory subsystems 516 may be any memory subsystem that allows for rapid access to stored information. For example, the memory subsystems 516 may be DDR or SDRAM.

A memory unit 517 communicates directly with the memory subsystems 516. The memory unit 517 is more efficient if there are large, less frequent, and less regular accesses to the memory subsystems 516. However, many of the components of the ASIC 510 may operate most efficiently when there are smaller, but more frequent, and more regular memory transactions. The direct memory access ("DMA") unit 518 acts as a buffering interface such that the components may have small, frequent, and regular transactions with the DMA unit 518, while leaving it up to the DMA unit 518 to bundle the smaller transactions into larger, less frequent, and less regular transactions for the memory unit 517 to conduct with the memory subsystems 516. In this manner, when a component needs to access the memory subsystems 516, the component either communicates directly with the memory unit 517 or communicates through the DMA unit 518 depending on the nature of the transaction.

A universal serial bus ("USB") interface 519 is capable of running a universal serial bus. The USB unit 519 may be any conventional USB interface that is capable of interfacing with the control bus 511 and the memory bus 512.

A device unit 521 includes interfaces for a number of miscellaneous devices. For example, the device unit 521 contains a bi-directional interface, for an I2C bus 522 for communication with external components, a bi-directional interface for a smart card 523, a bi directional infra red ("IR") serial interface 524, and a bi-directional ISA/IDE bus 525 that interfaces with a read only memory 526, a hard disk drive 527, and a system data store 528, as well as a number of other devices such as a DVD-ROM drive.

A graphics unit 542 comprises a 3-D graphic rendering engine that may be, for example, an eight million polygon DirectX7 compatible 3-D graphics unit.

An audio unit 529 drives a PC audio interface 530 such as an AC'97 audio interface that may receive or transmit audio. The audio unit 529 may also drive other audio interfaces including a digital interface such as SPDIF digital audio interface 531.

A video unit 532 receives video data from the memory bus 512 and converts the video data into a digital display. The video unit 532 handles multiple windows of video data and may operate in RGB, YGB, or other color formats as needed. The video unit 532 provides the digital display data to the digital video encoder 533 which converts the digital display data into the desired format (e.g., NTSC or HDTV) and provides the digital video through a digital to analog converter ("DAC") and filter 534 to a composite, S-Video or component output. The digital video encoder 533 also may output the video to a digital video interface ("DVI") 535 using a DVI converter 536.

An MPEG decoder 538 is provided to decode MPEG streams. The MPEG decoder also performs subsample decoding by reducing the frame size of the resulting decoded frame.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. In a computerized system that provides a user interface for selecting one or more options from a plurality of available options, a method of presenting a plurality of options for selection in a two-dimensional menu, the method comprising acts of:

defining each of the plurality of options as either (i) a category, or (ii) a sub-category associated with a category, wherein one or more categories and one or more sub-categories are defined, and wherein the association between categories and sub-categories is unrelated to time;

displaying a plurality of the categories along a first, category axis; and simultaneous with the display of the plurality of the categories, displaying with each of the plurality of categories one or more corresponding sub-categories along a second, sub-category axis, wherein the sub-category axis is orthogonal to the category axis, and a plurality of the sub-categories is displayed without having first to highlight or select any of the displayed categories.

2. A method as recited in claim 1, wherein more categories are defined than can be displayed at one time along the category axis, the method further comprising an act of scrolling the display of the at least one of the one or more categories.

3. A method as recited in claim 2, wherein at least a first category and a last category are defined, and wherein the act of scrolling the display is both linear and circular in that while scrolling linearly, the last category can be reached as if it preceded the first category and in that the first category can be reached as if it followed the last category.

4. A method as recited in claim 1, further comprising acts of:
receiving input that selects a particular category, wherein a plurality of sub-categories are associated with the particular category; and
displaying the plurality of sub-categories that are associated with the particular category without displaying any other sub-category.

5. A method as recited in claim 1, wherein each category has associated text in a given language which is written in a particular direction, and wherein the category axis extends in a direction that is based on the particular direction in which the associated text is written.

6. A method as recited in claim 1, further comprising an act of receiving input for either (i) navigating between any two of the plurality of options, or (ii) selecting a particular option.

7. A method as recited in claim 1, wherein each of the displayed one or more categories and each of the simultaneously displayed one or more sub-categories is available for immediate selection.

8. A method as recited in claim 1, wherein a plurality of categories are defined, and for each category, an unequal number of sub-categories are defined, the method further comprising an act of redisplaying a given category following display of a last sub-category for the given category, such that the redisplayed given category borders display of at least one sub-category of at least one other category.

9. A method as recited in claim 1, further comprising an act of scrolling the display of the at least one of the one or more sub-categories without scrolling the display of the at least one of the one or more categories.

10. A method as recited in claim 1, wherein the at least one of the one or more categories is displayed in a category color, and wherein the at least one of the one or more sub-categories is displayed in a sub-category color, the sub-category color differing from the category color.

11. A method as recited in claim 1, wherein the computerized system is used for viewing video data, the method further comprising an act of, simultaneous with the display of the at least one of the one or more categories and the at least one of the one or more sub-categories, displaying video data and displaying help information for a currently highlighted option.

12. A method as recited in claim 1, wherein the computerized system is capable of receiving broadcast video data and is capable of interacting with one or more servers over a computer network, and wherein the plurality of options comprise configuration options for the computerized system.

13. A method as recited in claim 1, wherein the plurality of options comprise a collection of data that is subject to change each time the plurality of options are displayed.

14. A method as recited in claim 13, wherein the collection of data comprises one or more names.

15. A method as recited in claim 1, wherein displaying the plurality of categories and the corresponding plurality of sub-categories comprises displaying the categories and a plurality of sub-categories in a grid that includes the plurality of categories displayed orthogonally to the plurality of sub-categories.

16. A method as recited in claim 15, wherein the method further includes scrolling the sub-categories corresponding to at least one of the displayed categories.

17. A method as recited in claim 15, wherein at least one of the plurality of categories is displayed with all of its one or more corresponding sub-categories in single line.

18. A method as recited in claim 15, wherein the grid has a plurality of cells, wherein each of the plurality of cells has appreciable borders.

19. A method as recited in claim 18, wherein each of the plurality of cells has text therein, wherein the text is indicative of one of the plurality of options.

20. A method as recited in claim 15, wherein the grid is a first grid, and wherein the method further comprises presenting a second grid containing an electronic program guide, wherein the second grid has a structure corresponding to the first grid.

21. A method as recited in claim 1, wherein each category has associated text in a given language which is written in a particular direction, and wherein the sub-category axis extends in a direction that is based on the particular direction in which the associated text is written in the particular language.

22. A method as recited as in claim 1, wherein the category axis is substantially vertical and the sub-category axis is substantially horizontal.

23. A method as recited in claim 1, wherein a plurality of sub-categories is displayed with each corresponding displayed category.

24. A method as recited in claim 1, wherein each of the plurality of options represents a task that can pursued immediately.

25. For a computerized system that provides a user interface for selecting one or more options from a plurality of available options, a computer program product carrying computer executable instructions that implement a method of presenting a plurality of options for selection in a two-dimensional menu, the method comprising acts of:
defining each of the plurality of options as either (i) a category, or (ii) a sub-category associated with a category, wherein one or more categories and one or more sub-categories are defined, and wherein the association between categories and sub-categories is unrelated to time;

displaying a plurality of the categories along a first, category axis; and simultaneous with the display of the plurality of the categories, displaying with each of the plurality of categories one or more corresponding sub-categories along a second, sub-category axis, wherein the sub-category axis is orthogonal to the category axis, and wherein a plurality of the sub-categories is displayed without having first to highlight or select any of the displayed categories.

26. A computer program product as recited in claim 25, wherein more categories are defined than can be displayed at one time along the category axis, the method further comprising an act of scrolling the display of the at least one of the one or more categories.

27. A computer program product as recited in claim 26, wherein at least a first category and a last category are defined, and wherein the act of scrolling the display is both linear and circular in that while scrolling linearly, the last category can be reached as if it preceded the first category and in that the first category can be reached as if it followed the last category.

28. A computer program product as recited in claim 25, the method further comprising acts of:
receiving input that selects a particular category, wherein a plurality of sub-categories are associated with the particular category; and
displaying the plurality of sub-categories that are associated with the particular category without displaying any other sub-category.

29. A computer program product as recited in claim 25, wherein each category has associated text in a given language which is written in a particular direction, and wherein the category axis extends in a direction that is based on the particular direction in which the associated text is written.

30. A computer program product as recited in claim 25, further comprising an act of receiving input for either (i) navigating between any two of the plurality or options, or (ii) selecting a particular option.

31. A computer program product as recited in claim 25, wherein a plurality of categories are defined, and for each category, an unequal number of sub-categories are defined, the method further comprising an act of redisplaying a given category following display of a last sub-category for the given category, such that the redisplayed given category borders display of at least one sub-category of at least one other category.

32. A computer program product as recited in claim 25, further comprising an act of scrolling the display of the at least one of the one or more sub-categories without scrolling the display of the at least one of the one or more categories.

33. A computer program product as recited in claim 25, wherein the at least one of the one or more categories is displayed in a category color, and wherein the at least one of the one or more sub-categories is displayed in a sub-category color, the sub-category color differing front the category color.

34. A computer program product as recited in claim 25, wherein the computerized system is used for viewing video data, the method further comprising an act of, simultaneous with the display of the at least one of the one or more categories and the at least one of the one or more sub-categories, displaying video data and displaying help information for a currently highlighted option.

35. A computer program product as recited in claim 25, wherein the plurality of options comprise a collection of data that is subject to change each time the plurality of options are displayed.

36. A computer program product as recited in claim 35, wherein the collection of data comprises one or more names.

37. In a computerized system that provides a user interface for selecting one or more options from a plurality of available options, a method of presenting a plurality of options for selection, the method comprising steps for:
organizing each of the plurality of options into either (i) a category, or (ii) a sub-category associated with a category, wherein one or more categories and one or more sub-categories are identified, and wherein the association between categories and sub-categories is independent of time;
listing a plurality of the categories along a first, category axis; and
simultaneous with listing the plurality of the categories, listing with each of the plurality of categories one or more corresponding sub-categories along a second, sub-category axis, wherein a plurality of the sub-categories is listed without having first to highlight or select any of the listed categories.

38. A method as recited in claim 37, wherein more categories are identified than can be listed at one time along the category axis, including at least a first category and a last category, the method further comprising an act of scrolling the display of the at least one of the one or more categories, wherein the act of scrolling the display is both linear and circular such that while scrolling linearly along the category axis, the last category can be reached as if it preceded the first category and such that the first category can be reached as if it followed the last category.

39. A method as recited in claim 37, wherein each category has associated text in a given language which is written in a particular direction, and wherein the category axis extends in a direction to account for the particular direction in which the associated text is written.

40. A method as recited in claim 37, further comprising an act of receiving input for either (i) navigating among the plurality of options, or (ii) selecting a particular option.

41. A method as recited in claim 37, wherein a plurality of categories are identified, and for each category, various numbers of sub-categories are identified, the method further comprising a step for repeating a given category following the listing of a last sub-category for the given category, such that the repeated given category borders the listing of at least one sub-category of at least one other category.

42. A method as recited in claim 37, further comprising a step for distinguishing the appearance of at least one of the one or more categories from the appearance of the at least one of the one or more sub-categories.

43. A method as recited in claim 37, wherein the computerized system is used for viewing video data, the method further comprising a step for, simultaneous with listing the at least one of the one of the or more categories and the at least one of the one or more sub-categories, showing video data and showing help information for a currently highlighted option.

44. A method as recited in claim 37, wherein the plurality of options comprise a collection of data that is subject to change each time the plurality of options are displayed.

45. For a computerized system that provides a user interface for selecting one or more options from a plurality of available options, a computer program product carrying computer executable instructions that implement a method of presenting a plurality of options for selection, the method comprising steps for:

organizing each of the plurality of options into either (i) a category, or (ii) a sub-category associated with a category, wherein one or more categories and one or more sub-categories are identified, and wherein the association between categories and sub-categories is independent of time;

listing a plurality of the categories along a first, category axis; and simultaneous with listing the plurality of the categories, listing with each of the plurality of categories one or more corresponding sub-categories along a second, sub-category axis, wherein a plurality of the sub-categories is listed without having first to highlight or select any of the displayed categories.

46. A computer program product as recited in claim 45, wherein more categories are identified than can be listed at one time along the category axis, including at least a first category and a last category, the method further comprising an act of scrolling the display of the at least one of the one or more categories, wherein the act of scrolling the display is both linear and circular such that while scrolling linearly along the category axis, the last category can be reached as if it preceded the first category and such that the first category can be reached as if it followed the last category.

47. A computer program product as recited in claim 45, wherein each category has associated text in a given language which is written in a particular direction, and wherein the category axis extends in a direction to account for the particular direction in which the associated text is written.

48. A computer program product as recited in claim 45, the method further comprising an act of receiving input for either (i) navigating among the plurality of options, or (ii) selecting a particular option.

49. A computer program product as recited in claim 45, wherein a plurality of categories are identified, and for each category, various numbers of sub-categories are identified, the method further comprising a stop for repeating a given category following the listing of a last sub-category for the given category, such that the repeated given category borders the listing of at least one sub-category of at least one other category.

50. A computer program product as recited in claim 45, further comprising a step for distinguishing the appearance of at least one of the one or more categories from the appearance of the at least one of the one or more sub-categories.

51. A computer program product as recited in claim 45, wherein the computerized system is used for viewing video data, the method further comprising a step for, simultaneous with listing the at least one of the one or more categories and the at least one of the one or more sub-categories, showing video data and showing help information for a currently highlighted option.

52. A computer program product as recited in claim 45, wherein the plurality of options comprise a collection of data that is subject to change each time the plurality of options are displayed.

* * * * *